United States Patent
Gill et al.

(10) Patent No.: US 6,430,555 B1
(45) Date of Patent: Aug. 6, 2002

(54) METHOD AND DEVICE FOR DATA TRANSMISSION BETWEEN A CENTRAL UNIT AND A DATA TERMINAL

(75) Inventors: Thorsten Gill, Essen; Ralf Kolb, Willich; Werner Schulz, Meerbusch; Derk Meyer, Düsseldorf, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/284,594
(22) PCT Filed: Oct. 14, 1997
(86) PCT No.: PCT/DE97/02448
§ 371 (c)(1),
(2), (4) Date: Apr. 16, 1999
(87) PCT Pub. No.: WO98/17040
PCT Pub. Date: Apr. 23, 1998

(30) Foreign Application Priority Data

Oct. 16, 1996 (DE) .......................................... 196 44 703

(51) Int. Cl.[7] .............................................. G06F 17/30
(52) U.S. Cl. .............................. 707/4; 707/10; 707/102
(58) Field of Search .................................. 707/104, 103, 707/4, 5, 9, 10, 102; 379/211; 711/152; 701/201–213

(56) References Cited

U.S. PATENT DOCUMENTS

| | | | | |
|---|---|---|---|---|
| 4,489,380 A | * | 12/1984 | Carey et al. ................. | 364/200 |
| 4,543,789 A | * | 10/1985 | Norton ......................... | 60/545 |
| 5,243,645 A | * | 9/1993 | Bissell et al. ................. | 379/211 |
| 5,465,401 A | * | 11/1995 | Thompson .................... | 455/89 |
| 5,659,742 A | * | 8/1997 | Beattie et al. ............... | 395/615 |
| 5,675,788 A | * | 10/1997 | Husick et al. ............... | 395/615 |
| 5,724,575 A | * | 3/1998 | Hoover et al. ............... | 395/610 |
| 5,737,734 A | * | 4/1998 | Schultz .......................... | 707/5 |
| 5,742,816 A | * | 4/1998 | Barr et al. .................... | 395/615 |
| 5,802,518 A | * | 9/1998 | Karaev et al. ................. | 707/9 |
| 5,819,264 A | * | 10/1998 | Palmon et al. ................ | 707/4 |
| 5,832,499 A | * | 11/1998 | Gustman ..................... | 707/103 |
| 6,149,318 A | * | 11/2000 | Chase et al. ................ | 395/704 |

* cited by examiner

Primary Examiner—Kim Vu
Assistant Examiner—Tam Nguyen
(74) Attorney, Agent, or Firm—Cohen, Pontani, Lieberman & Pavane

(57) ABSTRACT

The invention relates to a process for data exchange via a communications channel between a central unit, which processes, stores and provides data, and a data terminal device. Initially, a permanently unchanged application-independent query structure (general query structure) is stored both in the central unit and in the data terminal device, as are a small number of permanently unchanged application-independent response formats. For each application, the specific query structure is defined on the basis of the general query structure and is stored in the central unit in the form of a parameter set. As needed, the data terminal device requests from the center unit, via the communications channel, a specific query structure not yet stored in the data terminal device and receives and stores the applicable parameter set. To implement a query functionality, the applicable specific query structure is created in the data terminal device from the general query structure on the basis of the applicable parameter set and, after being at least partially filled out with values by the user, is transmitted to the central unit. The data terminal device makes responses transmitted from the central unit in response to queries available to the user based on one of the stored response formats, which is designated in the particular response.

23 Claims, 3 Drawing Sheets

```
IDENTIFICATION NUMBER OF
    COMPOSITE FUNCTION

NAME

NUMBER OF PARAMETERS
```

```
       PARAMETER 1

- DATA TYPE

- OPTIONAL / COMPULSORY

- NAME

- RANGE
```

⋮

```
       PARAMETER n

- DATA TYPE

- OPTIONAL / COMPULSORY

- NAME

- RANGE
```

FIG.3

METHOD AND DEVICE FOR DATA TRANSMISSION BETWEEN A CENTRAL UNIT AND A DATA TERMINAL

BACKGROUND OF THE INVENTION

1. Field of the Invention

The invention relates to a process and a device for the exchange of data via a communications channel between a central unit, which processes, stores and provides data, and a data terminal device, whereby application-related queries (query functionalities) with specific query structures corresponding to given applications are sent from the data terminal device to the central unit,

2. Description of Related Art

Data exchanges of this type take place, for example, between the personal computers of various users [sic], who are connected to a data base computer (e.g., a patent data base) via a communications channel embodied as a data network. As a rule, to acquire desired information from the data base, users must formulate their queries in a particular fixed query language predetermined for use with the data base computer in question. In addition, the responses supplied by the data base computer are, like the user queries, transmitted in fixed predetermined structures. In such applications, the data terminal device of the user is usually stationary; however, its geographic location is of no significance.

However, in certain applications, for example, in the field of traffic telematics, the location of the data terminal device is important. For instance, in off-board navigation systems, the traffic computer queried by a user from a vehicle must obtain information on the user's current location in order to transmit suitable route recommendations or relevant traffic information to the user's data terminal device. Furthermore, future applications in this field will use existing traffic telematic device technology, without, however, being directly concerned with specific traffic-related information. For example, the user devices for off-board navigation that are installed in vehicles or carried by individuals and that receive information from a central unit via a wireless communications channel are also suitable for responding to queries about, say, hotels in a predetermined area around the current location of the user. In such cases, the central unit that possesses the desired information must know the current user location to be able to select the relevant data. Similarly, other new services could provide information on currently available parking in the vicinity of the user, for example, or could allow drivers to reserve particular parking places. In addition, desired information on points of interest to the user (e.g., sightseeing, museums and restaurants) could be furnished.

Terminal devices for off-board navigation are fundamentally suitable for such services and simply require appropriate modification. For example, to make accessing these services as simple as possible for users, the terminal device should offer a type of screen mask, into which a user can input essential parameters to narrow down his questions. For instance, in the case of a query about hotels, these parameters could include "maximum distance from current location of user," "hotel category," "availability of certain facilities" (e.g., tennis courts, swimming pool) and "number of rooms needed." Such a screen mask (query structure) with data field designations would have to be stored in the user data terminal device for each service used (query functionality), as would a format for displaying the response transmitted from the queried central unit.

Today, the storage of suitable query structures and the formatting to display responses are usually implemented in data terminal devices by means of software. By loading a new program into a data terminal device, it is possible to expand the scope of usable query functionalities, particularly to include services that did not even exist when the data terminal device was purchased. Despite this basic technical flexibility, however, it would be very expensive to introduce new software for the purpose of making a genuinely mass application accessible to many thousands or even hundreds of thousands of users. According to the current state of the art, for example, interested users would have to be burdened to obtain technical assistance to have such updates installed into their data terminal devices. This procedure would be made even more difficult, as a rule, by the necessity of loading different manufacturer-specific software versions.

SUMMARY OF THE INVENTION

The object of the invention is therefore to propose a generic process and device that permit the necessary software in the data terminal device to be adapted to new or modified query functionalities without great expense.

The invention starts from the recognition that data base queries, including queries made via mobile data terminal devices in the framework of information services for traffic telematic applications, always conform to a parameterable operational sequence (query structure). The invention makes it unnecessary to store query structures designed in advance to serve as explicitly predetermined complete program sequences for each application. Instead, for the purpose of defining and storing such specific query structures, the invention provides an application-independent query structure, i.e., a general query structure that, in each specific case, is used with an application-specific parameter set. This general query structure is stored in each data terminal device and in the central unit and remains permanently unchanged. Specific query structures can then be determined in the data terminal device by interpreting the general query structure on the basis of the specific parameter set provided for the application in question.

Compared with the prior art, the invention also clearly simplifies the transmission of responses from the central unit to the data terminal device. Studies have shown that the specific response structures suitable for practically all possible query functionalities can be divided into a few basic patterns. Instead of storing an individual response structure for each individual query functionality in the data terminal device and the central unit, as has been done, it is now possible, according to the invention, to store only a few application-independent response formats in the data terminal device and the central unit, and to then assign each response to one of these formats.

The process according to the invention is thus characterized by the fact that initially, a permanently unchanged application-independent query structure (general query structure) is entered into both the central unit and the data terminal device, as are a small number of permanently unchanged application-independent response formats. The specific query structure needed for each particular application is defined in dependence on the general query structure, and then stored in the central unit in the form of a parameter set. As desired, the user can use his data terminal device to request from the central unit, via the communications channel, a specific query structure not yet stored in his data terminal device. The data terminal device then receives and stores this requested query structure in the form of the parameter set associated with the application in question. To use the application, i.e., to implement a query functionality, the specific query structure for the application is created in the data terminal device by interpreting the general query structure on the basis of the applicable parameter set. This specific query structure is at least partially filled out with suitable values by the user, and is then transmitted as a query to the central unit. The response subsequently transmitted from the central unit to the data terminal device via the communications channel is made available to the user (e.g., via an optical display device) on the basis of a response format stored in the data terminal device and designated in the response itself. Advantageously, the general query structure contains an identification of the particular query functionality, a list of query parameters, and a list of data types of the query parameters. The predetermined predefined response formats, which are stored both in the data terminal device and the central unit, should comprise at least a single data set and a selection list of data sets. The minimum number of predefined response formats is two, while the maximum number is ten, and preferably five. Often, it is helpful to store the specific query structures in the sense of the invention, i.e., the parameter sets, in the data terminal device over a long term. However, this is by no means necessary. It is also possible for the applicable parameter set to be newly transmitted to the data terminal device for each new query. In this case, the method used in the preferred embodiment of the invention can also be used for query functionalities newly entered into the central unit. The data terminal device is equipped, in the framework of the general query structure, with a permanent fundamental query option for requesting the available query functionalities from the central unit. The new query functionalities displayed in response to such a general request by the data terminal device are preferably presented in the form of a list of all currently available query functionalities. By selecting a particular query functionality, it is possible for the data terminal device to request a specific query structure, as needed.

The invention makes it possible to easily accommodate changes in the query structure of existing query functionalities. When a query is made on the basis of a specific query structure that has been stored in the data terminal device but no longer corresponds to the current status, it is possible, according to the invention, for the current version of the specific query structure to be automatically transmitted from the central unit to the data terminal device and stored there in the form of the applicable parameter set. The user can then easily send an updated query to the central unit. In the data terminal device, it is advisable to make the specific query structure visible to the user in the form of an input mask for entering at least some of the parameters of a query. For many applications, it is advantageous to have at least one query parameter filled out automatically by the data terminal device. For example, data describing the current geographic position of the user or data terminal device are particularly suitable for such automatic entry. This is particularly advantageous when a mobile data terminal device is being used, especially in a vehicle. In this case, data is exchanged between the central unit and the data terminal device via a wireless communications connection. Of course, this type of communications channel can also be used in permanently installed data terminal devices. As a rule, however, standard connections via data lines are used in such cases. When wireless communications are used, it is especially advisable to carry out the data exchange in coded form in the framework of cellular mobile telephone communications. The invention can be used with special advantage for applications in which traffic information and/or information on points of interest to tourists is kept in the central unit, and the geographic coordinates of selected interest points are requested by the user via the data terminal device.

Because the general query structure and the predefined application-independent response formats must be permanently stored in the data terminal device, the use of suitable write-protected memories is recommended for this purpose. It is further recommended that the data terminal device be equipped with an input keyboard and an optical display device. Of course, it is also possible to equip the data terminal device with voice output means for providing responses to the user. To permit the automatic transmission of current position data from a data terminal device, especially a mobile data terminal device, to the central unit, the data terminal device must be equipped with or connected to a device for the automatic determination of geographic position.

The essential advantage of the invention is the extraordinarily great flexibility it provides with respect to the modification of existing services and the introduction of new services. These services can therefore be made available to the owners of data terminal devices that were not necessarily designed in advance specifically to use these services. Because only several basic structures need to be stored in each data terminal device, the manufacturer-specific designs (e.g., selection of microprocessor or operating system) of the individual user devices play no role in the implementation of the invention. Users are not obliged to obtain technical assistance to update the software status of their data terminal devices. In addition, the communications expense for transmitting the specific query structures is very low. As a rule, a maximum total field length of 140 bytes is sufficient for one parameter set.

BRIEF DESCRIPTION OF THE DRAWINGS

Below, the invention is described in greater detail in reference to FIGS. 1 through 3. The drawings show:

FIG. 3 is a diagram of the structure of a parameter set.

DETAILED DESCRIPTION OF PREFERRED EMBODIMENTS

Figure 1:
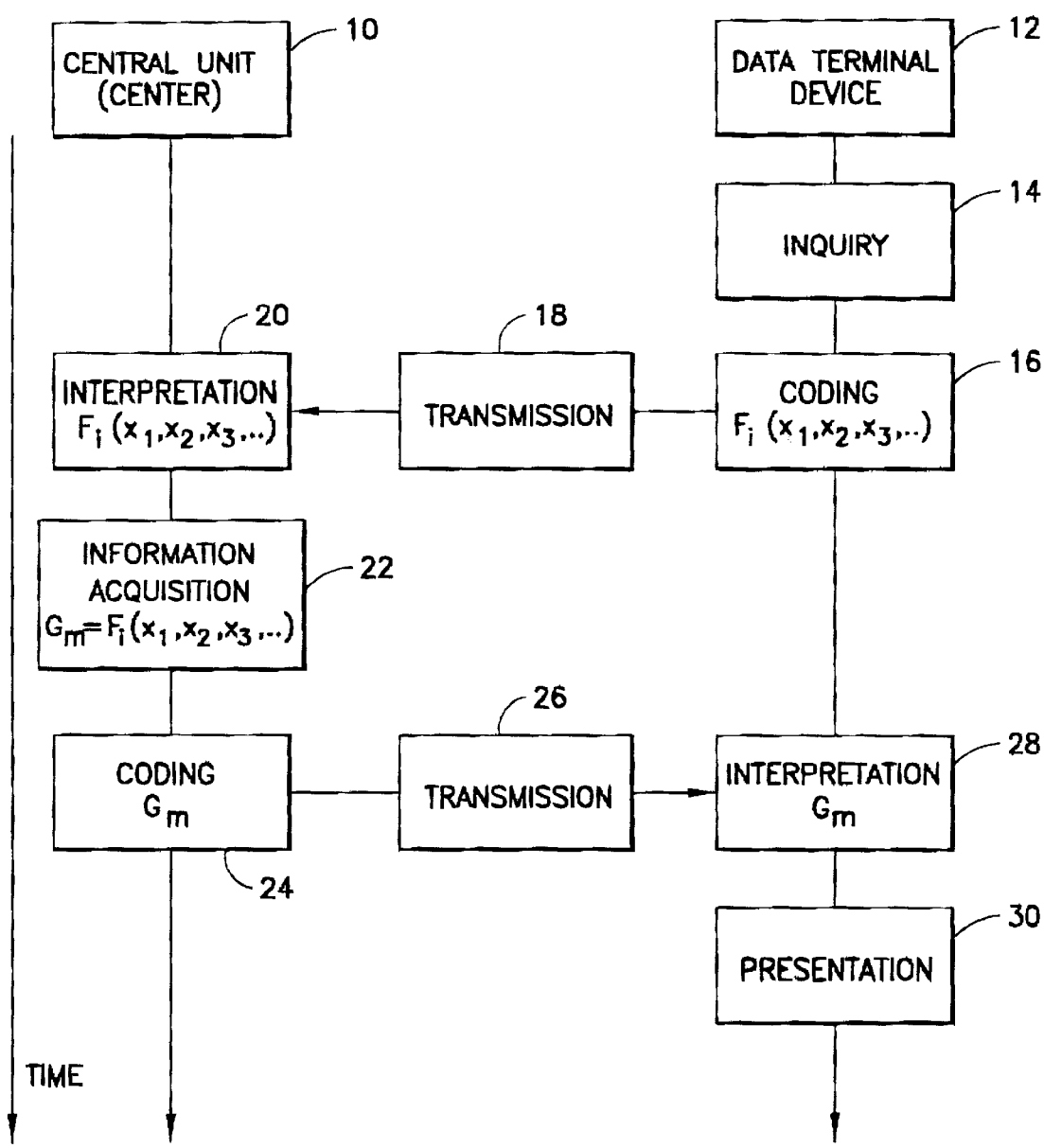
FIG. 1 is a diagram of the operational sequence of a conventional information query.

FIG. 1 shows, generally and schematically, the conventional sequence of an information query taking place between a central unit (center) 10 and a data terminal device (terminal device) 12. A query 14 is entered by the user via a keyboard, for example, and then transmitted 18 in coded form 16 to the center 10. The query 14 can be generally described as the composite function Fi of a series of parameters $x_1, x_2, x_3, \ldots$ This transmitted query is then interpreted 20 in the center, and the desired information $G_m = F_i(x_1, x_2, x_3, \ldots)$ is found 22. The desired information is coded 24 and transmitted in its coded form as a response to the data terminal device. There, the response $G_m$ is interpreted 26 and then optically displayed or presented 30 in some other manner for the user. This operational sequence is that of the prior art. It requires that the query be known and established in structure and data type at both the data terminal end and the center; that is, the composite function $F_i$ and the parameters $x_1, x_2, x_3, \ldots$ must be individually defined and known.

For this reason, a well-defined mask generally underlies the query. This mask is used at the data terminal end to enter the parameters as well as at the center to interpret the transmitted parameters. Modification or expansion of the query requires software modification both at the center and in the data terminal device.

Figure 2:
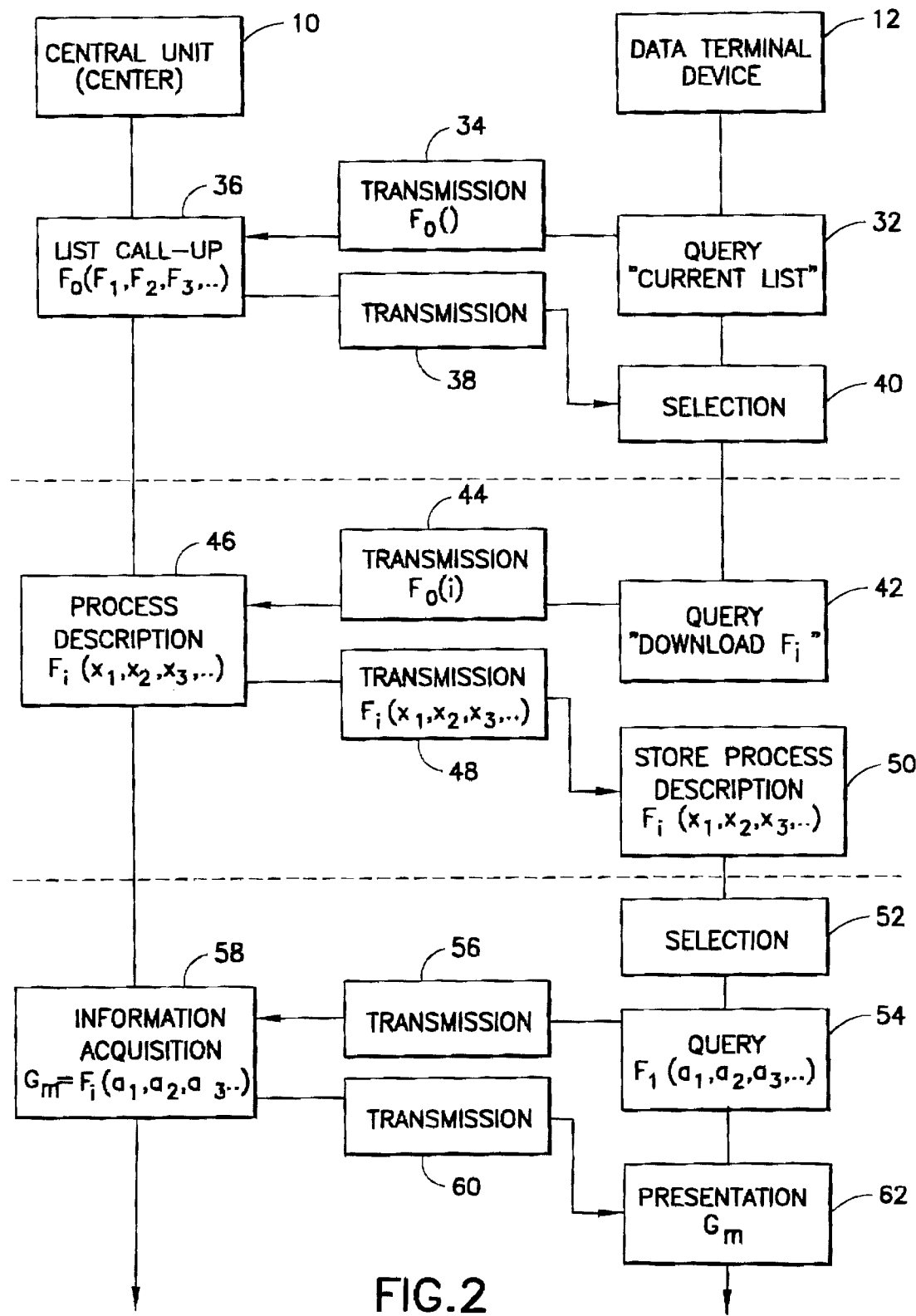
FIG. 2 is a diagram of the operational sequence of the process according to the invention.

In contrast, the present invention calls for a different operational sequence, as shown in FIG. 2 in simplified form. Here, the characterizing feature is the possibility of transmitting a query structure, i.e., a process description via which the user requests parameters from the central unit, to the data terminal device in the form of a digital message. In terms of programming, the data terminal device 12 via which a user implements a query functionality is initially equipped with a general query structure as well as with an option for requesting the selection list of query functionalities (current list) 32 available at the center. This basic query, which is identified as $F_0$ in FIG. 2, is transmitted to 34 the center 10, where it results in a corresponding list of the offered services 36, identified as $F_0$ ($F_1, F_2, F_3, \ldots$), being called up. This list is transmitted 38 via the communications channel to the terminal device 12 and displayed there to the user, so that the user can select 40 the desired service and thus request the associated specific query structure $F_i$42. This user request is transmitted 44 via the communications channel to the center 10 and leads there to the provision 46 and subsequent transmission 48 of the composite function $F_i$ ($x_1, x_2, x_3, \ldots$) to the terminal device 12. The composite function $F_i$ contains the [application]-specific parameter list, on the basis of which an interpreter in the terminal device 12 interprets the general structure of the application-independent process description (general query structure) stored 50 in the terminal device in order to obtain the application-specific function. Advantageously, the application-specific composite function $F_i$ is then stored in the terminal device 12, so as to be immediately available for future applications without being retransmitted from the center 10. However, this is by no means obligatory.

One possible structure of the composite function F, i.e., the parameter list, is shown schematically in FIG. 3. An identification number of the function, its name, and the number of parameters belonging to the function are indicated at the head of this list. After this, the list must indicate the data type of each parameter 1 through n, whether entry of the parameter is optional or compulsory, the name of the parameter and, finally, the range of the parameter. These relatively few pieces of information, which can be transmitted in a brief digital message, suffice to unambiguously define the application-specific query structure on the basis of the stored general query structure.

In accordance with the desired query, the user then fills out 52 the parameter list (displayed to him in the form of an input mask, for example) with specific values, as necessary. Some parameter values can also be filled out by the terminal device itself. Particularly when the terminal device is connected to a locating device, the current geographic position of the terminal device, e.g., a mobile device, can be determined. The specific query 54 is then transmitted 56 via the communications channel to the center and there results in determination of the relevant information $G_m=F_i(a_1, a_2, a_3, \ldots)$(58). (58) This information is then transmitted 60 to the terminal device and made available to the user, for example, by being presented 62 on a display device. Because the manner in which the information is presented can vary considerably depending on the type of queried information, i.e., on the query functionality, the terminal device must be told how the presentation is to be implemented. According to the invention, this is done by permanently storing a small number (e.g., five) of permitted response formats in the terminal device. The transmission of the response $G_m$ from the center contains a parameter that indicates which response form in the terminal device is to be used as the basis for presentation to the user.

The current list $F_0$ of available query functionalities can be as follows, for example:

| | |
|---|---|
| Hotels | 123 |
| Restaurants | 124 |
| Telephone numbers | 125 |
| Museums | 126 |
| Events | 127 |
| Parking | 128 |
| . | . |
| . | . |
| . | . |

For example, if a user has decided to request the query functionality of "Hotels," the parameter set belonging to this application is transmitted to the user, so that he can formulate his specific question. The transmitted response could thus consist, for example, of a list of hotel names as well as relevant geographic information and telephone numbers.

Even with a limit of only three predefined response formats and six different data types (e.g., status, number, text, date/time, position and direction), a great number of different services can be realized in the sense of the invention, without undesired curtailment of the serviceability and informative content demanded in the responses transmitted in the framework of the various services.

FIG. 1
center
interpretation
information acquisition
coding
time
transmission
transmission
terminal device
inquiry
coding
interpretation
presentation FIG. 2
center
list call-up
process description
information acquisition
transmission
transmission
transmission
transmission
transmission
transmission
terminal device
query "current list"
selection
query "download $F_i$"
Store process description
selection
query
presentation FIG. 3
identification number of composite function
name
number of parameters
parameter 1
data type
optional/compulsory
name
range
parameter n
data type
optional/compulsory
name
range Today, the storage of suitable query structures and the formatting to display responses are usually implemented in data terminal devices by means of software. By loading a new program into a data terminal device, it is possible to expand the scope of usable query functionalities, particularly to include services that did not even exist when the data terminal device was purchased. Despite this basic technical flexibility, however, it would be very expensive to introduce new software for the purpose of making a genuinely mass application accessible to many thousands or even hundreds of thousands of users. According to the current state of the art, for example, interested users would have to take the trouble to obtain suitable technical assistance to have such updates installed into their data terminal devices. This procedure would be made even more difficult, as a rule, by the necessity of loading different manufacturer-specific software versions.

U.S. pat. No. 4,543,789 discloses a process for data exchange between a center and a terminal device with an application-specific query and response structure, whereby fixed formats for queries and responses are stored, into which the applicable contents of the queries and responses are inserted, are stored in the center and in the terminal device.

U.S. Pat. No. 5,465,401 discloses a communications system with multi-purpose terminal devices, in which information is input and output as well as transmitted to a center in various forms, particularly acoustically and by pressing keys. Fixed query structures are used in the terminal devices.

The object of the invention is therefore to propose a generic process and device that permit the necessary software in the data terminal device to be adapted to new or modified query functionalities without great expense.

This object is attained for a generic process by means of the characterizing features in Patent Claim 1. Advantageous further developments of the process are found in subclaims 2 through 13. The features of a device to implement the process according to the invention are indicated in Claim 14. Subclaims 15 through 23 characterize advantageous embodiments of this device.

The invention starts from the recognition that data base queries, including queries made via mobile data terminal devices in the framework of information services for traffic telematic applications, always conform to a parameterable operational sequence (query structure). The invention makes it unnecessary to store query structures designed in advance to serve as explicitly predetermined complete program sequences for each application. Instead,

What is claimed:

1. A process for transmitting data between a central unit for processing, storing and providing data and a data terminal device, wherein application related queries (query functionalities) having a specific query structure corresponding to a given application are directed from the data terminal device to the central unit where they are stored, and wherein responses of the central unit are transmitted to the data terminal device with a specific response structure corresponding to the given application, the process comprising the steps of:

initially storing a permanently unchanged application-independent query structure (general query structure) and a small number of application independent response formats in both the central unit and the data terminal device;

providing at least two specific response structures;

defining, for each application, the specific query structure on the basis of the application-independent query structure;

storing the defined specific query structure in the central unit in the form of a parameter set;

requesting, as needed, a specific query structure not yet stored in the data terminal device from the central unit via a communication channel;

receiving and storing, at me terminal device, a parameter set transmitted from the central unit corresponding to the requested specific query structure, and displaying the specific query structure to the user in the data terminal device in the form of an input mask for receiving entry of at least some of the parameters of a query;

implementing a query functionality by forming the applicable specific query structure in the data terminal device from the application-independent query structure on the basis of the received and stored applicable parameter set;

transmitting the applicable specific query structure to the central unit after it has been at least partially filed out with values by the user; and making available to the user, at the data terminal device, responses transmitted from the central unit based on one of the stored response formats designated in the particular response.

2. The process set forth in claim 1, further comprising the step of providing the application-independent query structure (general query structure) with an identification of the given query functionality, a list of query parameters, and a list of data types of the query parameters.

3. The process as set forth in claim 1, further comprising the step of providing the specific response structure with at least one data set and a selection list of data sets.

4. The process as set forth in claim 1, including providing no more than ten (10) specific response structures.

5. The process as set forth in claim 1, further comprising the steps of:

upon introduction of a new query functionality, storing an associated specific query structure in the central unit;

displaying, by the terminal device, the new query functionality within a list of all currently available query functionalities; and requesting, as needed by the data terminal device, the specific query structure of the new query functionality.

6. The process as set forth in claim 1, further comprising the step of storing the specific query structures in the data terminal for a predetermined long period of time.

7. The process as set forth in claim 1, further comprising the step of transmitting a current specific query structure from the central unit to the data terminal device when a query has been undertaken on the basis of a specific query structure that is stored in the data terminal device and which no longer corresponds to the current status.

8. The process as set forth in claim 1, further comprising the step of automatically filling out at least one query parameter with a value by the data terminal device.

9. The process as set forth in claim 8, wherein the at least one query parameter automatically filled-out comprises a description of the current geographic position of the data terminal device when said data terminal device is a mobile data terminal device.

10. The process as set forth in claim 9, wherein said mobile terminal device is disposed within a vehicle.

11. The process as set forth in claim 1, wherein data exchange performed during said steps of requesting, receiving and storing, and transmitting are performed by wireless communication transmission.

12. The process as set forth in claim 11, further comprising the step of coding the data exchange information using a cellular mobile telephone.

13. The process as set forth in claim 1, further comprising the steps of:
storing information relating to traffic and points of interest to tourists in the central unit; and
requesting, by the data terminal, geographic coordinates of selected points of interest stored in the central unit.

14. An apparatus for data transmission comprising:
a central unit for processing, storing and providing data;
at least one data terminal device having devices for data input and data output and being operably connected to the central unit via a communications channel for exchanging data between the central unit and data terminal device in a framework of various applications;
a permanently unchanged application-independent query structure (general query structure) and a small number of permanently unchanged application-independent response formats stored in both said unit and said at least one data terminal device for implementing data queries at the central unit for particular applications (query functionalities);
a parameter set stored in the central unit representing, for each application, a specific query structure that is defined on the basis of the stored application-independent query structure, wherein, as needed, a specific query structure not yet available in the data terminal device is requested by the data terminal device via the communications channel and can be transmitted from the central unit via the communications channel in the form of a parameter set and stored in the data terminal device, the specific query structure being displayed to the user in the form of an input mask; and
an interpreter in the data terminal device for forming a particular parameter set, wherein after being at least partially filled out with values by the user, the particular parameter set can be transmitted via a communication channel to the central unit;
wherein responses transmitted from the central unit in response to the queries can be presented for the user by the data terminal device based on one of the stored response formats, which is designated in the response.

15. The apparatus for data transmission in accordance with claim 14, wherein said application-independent query structure contains an identification of the given query functionality, a list of query parameters, and a list of data types of the query parameters.

16. The apparatus for data transmission in accordance with claim 14, wherein said stored predefined response formats comprise at least one individual data set and a selection list of data sets.

17. The apparatus for data transmission in accordance with claim 14, wherein the query functionalities currently available at the central unit can be requested by the data terminal device and displayed by the data terminal device in the form of a list for selection of a desired query functionality.

18. The apparatus for data transmission in accordance with claim 14, further comprising a write-protected memory within said data terminal device for storing the application-independent query structure and the predefined response formats.

19. The apparatus for data transmission in accordance with claim 14, wherein said data terminal device comprises an input keyboard and a display device for optical data output.

20. The apparatus for data transmission in accordance with claim 19, wherein said data terminal device further comprises a device for voice data output.

21. The apparatus for data transmission in accordance with claim 14, wherein said data terminal device is a mobile device capable of being carried in a motor vehicle.

22. The apparatus for data transmission in accordance with claim 21, further comprising a geographic position indicating device connected to the data terminal device for automatically determining the geographic position of the data terminal device, and wherein upon queries to the central unit, current geographic position data of the data terminal device is automatically transmitted to the central unit.

23. The apparatus for data transmission in accordance with claim 14, wherein the communication channel comprises a wireless communication connection.

* * * * *